United States Patent
Sukhomlinov et al.

(10) Patent No.: US 11,171,983 B2
(45) Date of Patent: Nov. 9, 2021

(54) TECHNIQUES TO PROVIDE FUNCTION-LEVEL ISOLATION WITH CAPABILITY-BASED SECURITY

(71) Applicant: INTEL CORPORATION, Santa Clara, CA (US)

(72) Inventors: Vadim Sukhomlinov, Santa Clara, CA (US); Kshitij Doshi, Tempe, AZ (US); Michael Lemay, Hillsboro, OR (US); Dmitry Babokin, Santa Clara, CA (US); Areg Melik-Adamyan, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 277 days.

(21) Appl. No.: 16/024,089

(22) Filed: Jun. 29, 2018

(65) Prior Publication Data
US 2019/0044971 A1     Feb. 7, 2019

(51) Int. Cl.
*G06F 12/14*     (2006.01)
*H04L 29/06*     (2006.01)
(Continued)

(52) U.S. Cl.
CPC ...... *H04L 63/1441* (2013.01); *G06F 9/45558* (2013.01); *G06F 12/14* (2013.01);
(Continued)

(58) Field of Classification Search
CPC ... H04L 63/1441; G06F 21/53; G06F 21/629; G06F 12/14; G06F 9/45558;
(Continued)

(56) References Cited

U.S. PATENT DOCUMENTS 3,916,385 A * 10/1975 Parmar ............... G06F 12/1491
                                                    711/109
4,177,510 A * 12/1979 Appell ................ G06F 12/1491
                                                    711/163
(Continued)

OTHER PUBLICATIONS

Joe Darbyshire, "Dissecting the POP SS Vulnerability", May 17, 2018, obtained online from "https://threatresearch.ext.hp.com/dissecting-pop-ss-vulnerability/", retrieved on Jun. 20, 2020.*
(Continued)

*Primary Examiner* — Farid Homayounmehr
*Assistant Examiner* — Zhimei Zhu
(74) *Attorney, Agent, or Firm* — Kacvinsky Daisak Bluni PLLC

(57) ABSTRACT

Embodiments are directed toward techniques to detect a first function associated with an address space initiating a call instruction to a second function in the address space, the first function to call the second function in a deprivileged mode of operation, and define accessible address ranges for segments of the address space for the second function, each segment to a have a different address range in the address space where the second function is permitted to access in the deprivileged mode of operation, Embodiments include switching to the stack associated with the second address space and the second function, and initiating execution of the second function in the deprivileged mode of operation.

25 Claims, 7 Drawing Sheets

(51) Int. Cl.
*G06F 9/455* (2018.01)
*G06F 21/57* (2013.01)
*G06F 21/53* (2013.01)
*G06F 21/62* (2013.01)

(52) U.S. Cl.
CPC ............ *G06F 21/53* (2013.01); *G06F 21/577* (2013.01); *G06F 21/629* (2013.01); *G06F 2009/45583* (2013.01); *G06F 2009/45587* (2013.01); *G06F 2221/2141* (2013.01)

(58) Field of Classification Search
CPC ........... G06F 21/577; G06F 2221/2141; G06F 2009/45583; G06F 2009/45587; G06F 12/1441
See application file for complete search history.

(56) References Cited

U.S. PATENT DOCUMENTS

| | | | | | |
|---|---|---|---|---|---|
| 5,418,956 | A | * | 5/1995 | Willman | G06F 12/1036 711/206 |
| 5,644,755 | A | * | 7/1997 | Wooten | G06F 9/45533 703/23 |
| 5,680,582 | A | * | 10/1997 | Slayden | G06F 12/023 711/171 |
| 5,948,097 | A | * | 9/1999 | Glew | G06F 9/4486 712/220 |
| 5,950,221 | A | * | 9/1999 | Draves | G06F 9/5016 707/999.009 |
| 6,385,727 | B1 | * | 5/2002 | Cassagnol | G06F 21/10 380/259 |
| 6,643,765 | B1 | * | 11/2003 | Hansen | G06F 9/30014 712/208 |
| 6,646,195 | B1 | * | 11/2003 | Puryear | G10H 1/0066 84/600 |
| 6,725,356 | B2 | * | 4/2004 | Hansen | G06F 9/30014 712/208 |
| 6,895,508 | B1 | * | 5/2005 | Swanberg | G06F 9/30043 711/152 |
| 7,478,388 | B1 | * | 1/2009 | Chen | G06F 9/45554 718/1 |
| 7,506,096 | B1 | * | 3/2009 | Koryakin | G06F 12/1036 711/6 |
| 7,950,022 | B1 | * | 5/2011 | Gould | G06F 13/102 719/327 |
| 7,950,025 | B1 | * | 5/2011 | McCann | G06F 9/545 719/310 |
| 8,205,218 | B1 | * | 6/2012 | McCann | G06F 9/4411 707/705 |
| 8,555,386 | B1 | * | 10/2013 | Belov | G06F 21/566 726/22 |
| 10,169,137 | B2 | * | 1/2019 | Cain | G06F 11/0721 |
| 10,223,290 | B2 | * | 3/2019 | Depeyrot | G06F 12/1425 |
| 2003/0229794 | A1 | * | 12/2003 | Sutton, II | G06F 21/57 713/189 |
| 2003/0236940 | A1 | * | 12/2003 | Wu | G06F 9/44521 711/103 |
| 2004/0064668 | A1 | * | 4/2004 | Kjos | G06F 12/1036 711/202 |
| 2004/0098548 | A1 | * | 5/2004 | Hansen | G06F 9/30101 711/165 |
| 2004/0133777 | A1 | * | 7/2004 | Kiriansky | G06F 21/53 713/166 |
| 2004/0177243 | A1 | * | 9/2004 | Worley, Jr. | G06F 9/545 713/2 |
| 2004/0250053 | A1 | * | 12/2004 | McGrath | G06F 9/342 712/229 |
| 2005/0016363 | A1 | * | 1/2005 | Puryear | G10H 1/183 84/626 |
| 2005/0097252 | A1 | * | 5/2005 | Kelley | G06F 21/53 710/200 |
| 2005/0251864 | A1 | * | 11/2005 | Kelley | G06F 9/468 726/26 |
| 2006/0218425 | A1 | * | 9/2006 | Ding | G06F 21/74 713/323 |
| 2006/0259487 | A1 | * | 11/2006 | Havens | G06F 21/57 |
| 2006/0277539 | A1 | * | 12/2006 | Amarasinghe | G06F 21/54 717/168 |
| 2008/0010425 | A1 | * | 1/2008 | Funk | G06F 12/1491 711/163 |
| 2008/0098362 | A1 | * | 4/2008 | Moore | G06F 9/4484 717/129 |
| 2008/0189512 | A1 | * | 8/2008 | Hansen | G06F 9/30007 712/1 |
| 2009/0089540 | A1 | * | 4/2009 | Hansen | G06F 9/30101 712/29 |
| 2009/0158012 | A1 | * | 6/2009 | Hansen | G06F 15/7842 712/222 |
| 2009/0217290 | A1 | * | 8/2009 | Nayberg | G06F 9/3851 718/108 |
| 2010/0030975 | A1 | * | 2/2010 | Murray | G06F 9/4552 711/154 |
| 2012/0166779 | A1 | * | 6/2012 | Muralidhar | G06F 1/3275 713/1 |
| 2013/0024929 | A1 | * | 1/2013 | Abraham | G06F 21/53 726/16 |
| 2013/0205403 | A1 | * | 8/2013 | Grocutt | G06F 21/52 726/27 |
| 2014/0033304 | A1 | * | 1/2014 | Lewis | G06F 21/53 726/22 |
| 2014/0237199 | A1 | * | 8/2014 | Murray | G06F 12/12 711/159 |
| 2015/0067763 | A1 | * | 3/2015 | Dalcher | G06F 21/566 726/1 |
| 2015/0128266 | A1 | * | 5/2015 | Tosa | G06F 21/52 726/23 |
| 2015/0212855 | A1 | * | 7/2015 | Klee | G06F 3/0605 718/104 |
| 2015/0215335 | A1 | * | 7/2015 | Giuliani | G06F 21/554 726/23 |
| 2017/0083701 | A1 | * | 3/2017 | Tajalli | G06F 16/245 |
| 2017/0228326 | A1 | * | 8/2017 | Depeyrot | G06F 12/1408 |

OTHER PUBLICATIONS

Intel® 64 and IA-32 Architectures, Software Developer's Manual, vol. 3A: System Programming Guide, Part 1, Nov. 1, 2006, obtained online from <https://www.intel.com/content/www/us/en/architecture-and-technology/64-ia-32-architectures-software-developer-vol-3a-part-1-manual.html>, retrieved on Jun. 28, 2021.*

Watson et al., "Capsicum: practical capabilities for UNIX" First published in Proceedings of the 19th USENIX Security Symposium—2010, 17 pages.

* cited by examiner

TECHNIQUES TO PROVIDE FUNCTION-LEVEL ISOLATION WITH CAPABILITY-BASED SECURITY

TECHNICAL FIELD

Embodiments described herein generally relate to techniques to provide function-level isolation with capability-based security in a deprivileged operation mode.

BACKGROUND

The area of computer security has become increasingly important in today's networked environment. Attacker's may utilize malicious software that infects a computing device and cause it to perform malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software and attackers.

DETAILED DESCRIPTION

Figure 1:
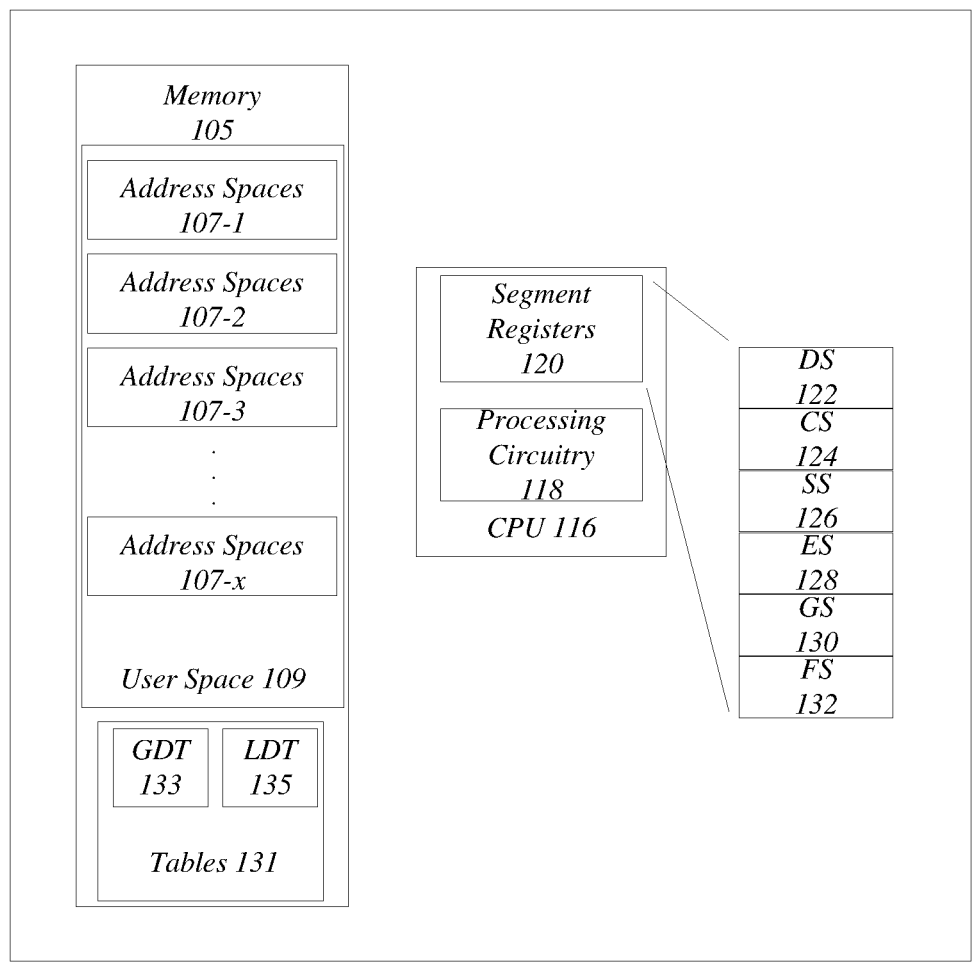
FIG. 1 illustrates an example embodiment of a device.

Embodiments discussed herein may apply in systems that enable sharing of hardware computing resources among tenants, such as Cloud computing, Function as a Service (FaaS), etc. These systems that share resources require a way to delimit actions and prevent cross-tenant workload interaction to preserve security and privacy. Delimited actions may include anything that needs to be pre-limited (contained)—usually, this applies to code that is hemmed in through isolation—for example, with sandboxes, virtual machines, etc. While there are methods addressing this challenge such as virtual machines, processes, namespaces for containers, and managed run-times, there are problems with start-up times, invocation performance and/or memory overhead, limiting applicability and density of deployments. Some applications, like Network Functions Virtualization (NFV), require latency in nanoseconds to microseconds range, while typical FaaS implementation of today would result in latency with 10s of milliseconds for invocation. Poll-mode, typically used in such applications, have another set of problems—density and memory overhead associated with isolation—VMs and Containers still require a large amount of memory—from few MBs to GBs, thus limiting the number of instances on a server, and Poll-Mode execution does not work well with oversubscription. On the other hand, the run-to-completion approach is either applicable only within a single application, due to shared memory space between function calls, or, if mapped to FaaS model with good isolation, will have high latency. In extreme case, when all applications are decomposed into functions (including OS, platform and infrastructure services) running both locally and remotely demands performance will reach hundreds of millions calls per second per server—something only reachable today for native code and CALL instruction.

FaaS adoptions are growing at an enormous rate (7-10× by 2021, as per http://blog.spotinst.com/2017/05/01/spotinsts-ceo-takeouts-serverlessconf-2017/), existing implementations create a number of problems. For example, current solutions typically require developers to release the source code. Releasing source code or any reverse engineerable format is that an application provider faces some risk of intellectual property (IP) leakage to service providers and the generally public. However, even if the service provider protects the source code, they may dispatch it in a separate container creating another set of problems, e.g., drains resources and increases latency. Thus, these prior implementations make it very hard to use FaaS in low latency implementations such as network packet processing applications, e.g., when packet data is passed as a parameter to a function, due to performance penalties of secure isolation. Prior systems also create a loss of efficiency due to the need to set up any execution time, e.g., compilation, translation, and verification, and for setting up isolation.

Embodiments discussed herein address the above-described problems by providing an execution environment which allows execution of functions, compiled in native code while implementing security sandboxing. Moreover, the function-level isolation/security described herein is applicable in a wide range of applications—from Cloud including FaaS model to lightweight isolation for reliability & security in the Internet of Things (IoT) applications. Embodiments are not limited to these examples.

Various embodiments may generally be directed to enabling a deprivileged operation mode that is configurable by user-level applications. In embodiments, a function can be fully contained and executed with restricted capabilities utilizing the deprivileged operation mode. The deprivileged operation mode limits use of system calls and instructions which cause context switches and exceptions, e.g., CALL FAR, MOV to a segment register, etc. Instead, these potentially 'dangerous' instructions are handled by the user-level application. For example, the user-level application may provide emulation of system calls and/or prevent execution. Moreover, an additional mechanism for legitimate external calls by deprivileged functions is provided, e.g., infrastructure services, function to function chaining, etc. An example of external call would be a list of 'system' functions exposed by the caller to callee, which callee can use to interact with the operating environment at the level allowed by the caller. This is one of the methods for implementing the capability-based model. Specific examples can be time, operating context, memory allocation, loading/storing data or context, etc. Embodiments provide improvements to the existing system, such as capabilities (allowed instructions/calls) defined by the caller function for the called code or function, enforced address protection with use of page permissions with protection key (PKEY) enforcement of additional page attributes and segment registers, and exception handling/emulation functionality implemented by the caller. Moreover, embodiments discussed herein provide efficient function-level isolation in contrast to prior systems that provide process or virtual machine level isolation.

Reference is now made to the drawings, wherein like reference numerals are used to refer to like elements throughout. In the following description, for purposes of explanation, numerous specific details are outlined to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates an example embodiment of a device 100 in which aspects of the present disclosure may be employed. In various embodiments, the device 100 may be embodied as any type of computing device, including a personal computing, a desktop computer, a tablet computer, a netbook computer, a notebook computer, a laptop computer, a server, server farm, blade server, or any other type of server, and so forth. In some embodiments, the device 100 may be a communication station, a mobile station, an advanced station, a client, a platform, a wireless communication device, a mobile computer, a set-top box, a handheld computer, a handheld device, a Personal Digital Assistant (PDA) device, a handheld PDA device, netbook, a mobile telephone, a smart phone, a mobile cellular telephone, and so forth. Embodiments are not limited in this manner.

The device 100 may include a number of devices, systems, components, circuitry and infrastructure to provide function-level isolation and enable a deprivileged operation mode, such as those illustrated in FIG. 1. Note that device 100 may include additional components, but are not shown for clarification purposes. In embodiments, the device 100 includes memory 105 and a processing unit (CPU) 116 to process data and information to enable function-level isolation, e.g., when making function calls from a function to another function.

The CPU 116 which may include one or more cores to process information for the device 100. The CPU 116 may be one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 116 may be connected to and communicate with the other elements of the computing system via one or more interconnects, such as one or more buses, control lines, and data lines.

The CPU 116 may also include a number of sub-elements, such as processing circuitry 118, memory (not shown), interfaces (not shown), registers including segment registers 120, and so forth. The segment registers 120 include the data segment (DS) register 122, a code segment (CS) register 124, a stack segment (SS) register 126, an extra segment (ES) register 128, the GS register 130, and the FS register 132. The CS register 124 stores the starting address of a code segment having instructions to be executed for a software program (function). The DS register 122 stores the starting address of the data segment, which contains data, constants, and a work area for a function. The SS register 126 includes the starting address of a stack and the stack typically includes data and return addresses functions or routines. The ES register 128, GS register 130, and FS register 132 are additional segment registers that do not have specifically designed by hardware.

Figure 2:
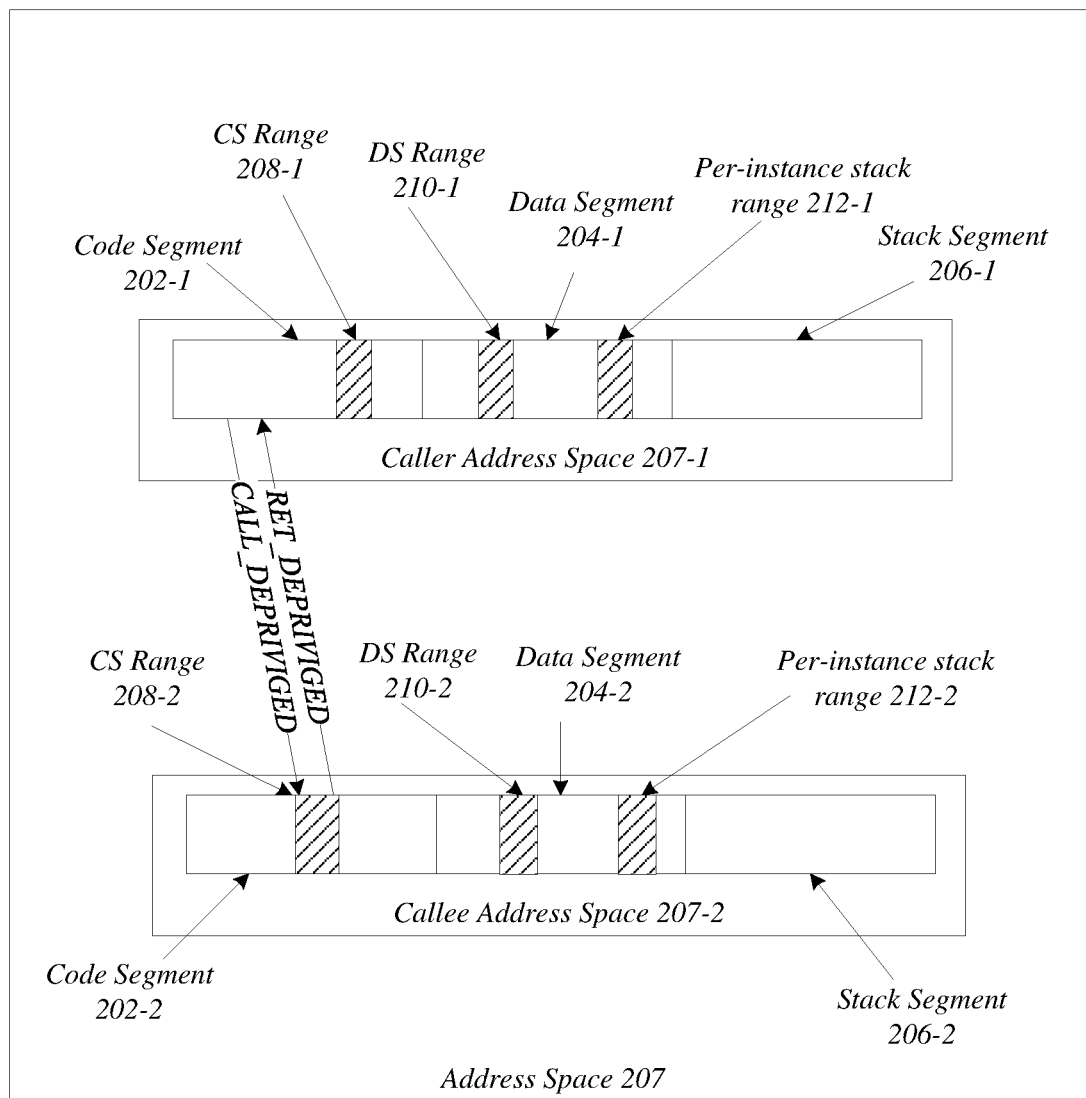
FIG. 2 illustrates an example of an instruction sequence.

The device 100 may also include tables 131, which may be utilized by the CPU 116 to define characteristics of memory areas of the memory 105. The tables 131 are data structures that may be stored in memory 105. For example, the tables 131 include a Global Descriptor Table (GDT) 133, which is a data structure used to define the characteristics of the various memory areas used during program execution, e.g., segment descriptors, including the base address, the size, and access privileges like executability and writability. These memory areas are segments, e.g., the code segments, the data segments, and the stack segments, as illustrated in FIG. 2. The tables 133 also include a Local Descriptor Table (LDT) 125 that contains descriptors for memory segments which are private to specific software programs and functions. In embodiments, the GDT 133 and an LDT 135 each include 8192 entries as descriptors or 16384 combined entries and specific entries can have up to 64-bit of data in 32-bit mode and 128 bits in 64-bit mode. The GDT 133 is typically stored in system space (not shown) of memory 105, and the LDT 135 can be in stored in system space or user space 109.

In embodiments, memory accesses that a program can perform goes through a segment. To reference a segment, a software program or function must use its index inside the GDT 133 or the LDT 135. As mentioned, the index is called a segment selector or selector in short. The selector is loaded into a segment register 120 to be used. Loading a selector into a segment register 120 automatically reads the GDT 133 or the LDT 135 and stores the properties of the segment inside the CPU 116 itself. In embodiments, the tables 131 (GDT 133 and/or LDT 135) may be utilized with the segment registers 120 to provide accessible ranges (isolation) in the segments when performing a deprivileged function call, as will be discussed in more detail below.

In embodiments, the device 100 includes memory 105 coupled with the CPU 116 via one or more interconnects. The memory 105 may store information and data for the CPU 116 to perform processing for the device 101. In embodiments, the memory 105 includes 'main' memory implemented as volatile memory. The memory 105 also includes virtual memory, e.g., the memory provided and controlled by an operating system mapped to the 'main' memory. The virtual memory may be implemented in volatile memory, non-volatile memory, and a combination therefor. In embodiments, the memory 105 may store information and data for an operating system (kernel/OS space) and software programs (user space 109) to operate. For example, the user space 109 may be a block of the memory that may be used by software programs to store information and data when executed by the CPU 116. In embodiments, the user space 109 may be divided into additional address spaces 107-1 through 107-x, where x may be any positive integer, that may each be associated and utilized by a software program to execute. More specifically, each of the address spaces 107 may include allocations of one or more of a code segment, a data segment, and a stack segment for the software program. The address spaces 107 may be allocated by the operating system and define a range of discrete addresses, each of which may correspond to a logical or physical entity, such as a memory cell, a disk sector, and so forth, and may be associated with one or more software programs.

In embodiments, a software program including functions may utilize or call other functions of other software programs. In some instances, these software programs may be in different address spaces 107, e.g., address space 107-1 and address space 107-2, and operate with different privilege levels. Thus, a caller function having a first allocated or associated address space 107-1 may call a callee function having second allocated or associated address space 107-2 having a different privilege level. In other instances, function calls may be made between function utilizing the same address space 107, e.g., a caller function may call a callee function within address 107-1.

To provide security, e.g., prevent a function perform to jump to malicious code, embodiments are directed to isolating the functions and handling attempts to perform 'dangerous' instructions. In one example, the function (caller) may utilize a far call instruction and a call gate to "call" the other function, e.g., a callee function in the other address space. Using a far call instruction may provide limited isolation between the caller and callee functions by having defined limits on the code segment of the callee function's address space, preventing execution outside of the callee function and supporting stack switching.

In embodiments, one or more of the segment registers 120 may be utilized to provide isolation, for example. The caller function can load the data segment (DS) segment register 122 with one of the prepared entries in GDT 133 or LDT 135 to limit address range available to called function, and the ES/FS/GS registers 128/130/132 can be used to provide access to tables which contains addresses of call-back functions and exception handlers which the called function can use to interact with caller/run-time environment. An exception handler address can be in defined location, for example at ES:0000000, referring to the entry point of exception handler with implied CS value of caller. Moreover, page protection keys can be used to protect critical data structures of caller function. However, this approach provides limited isolations between called functions.

Embodiments discussed herein may enable additional isolation between the called functions via hardware and/or software modifications, e.g., changes to call and return instructions. More specifically, embodiments include extending an existing instruction set to implement a modified call-return pair. The modified pair may be a CALL_DEPRIVILEGED and RET_DEPRIVILEGED that may be utilized by a user or programmer to invoke the deprivileged operation mode. Note that these names are not to be interpreted in a limited manner and embodiments discussed apply to functionally equivalent instructions that may have different names.

FIG. 2 illustrates one possible example of a sequence flow 200 of a call function associated with a caller address space 207-1 invoking a CALL_DEPRIVILEGED to a callee function associated with another address space 207-2. Note that the caller address space 207-1 and the callee address space 207-2 may be in the same address space 207, however, viewed from the perspective of the respective functions. For example, the caller function may be allocated a portion of the address 207 space as defined by caller address space 207-1 and the callee function may be allocated a portion of the address space 207 as defined by callee address space 207-2, as illustrated in FIG. 2.

The caller address space 207-1 includes a code segment 202-1, a data segment 204-1, and a stack segment 206-1, and the callee address space 207-2 similarly includes a code segment 202-2, a data segment 204-2, and a stack segment 206-2. Each of the functions may be associated with defined ranges of memory within their respective address spaces. For example, the caller function includes a code segment range 208-1, a data segment range 210-1, and a stack segment range 212-1. The callee function includes a code segment range 208-2, a data segment range 210-2, and a stack segment 212-2. Note that the stack segment ranges 212 may be pre-instances stack ranges and may be in the data segment 204 and the stack segment 206. As illustrated in FIG. 2, a function of a software program issues a CALL_DEPRIVILEGED instruction, and when the function returns, the address to which it returns is specially encoded to cause a RETURN_PRIVILEGED operation. The called function's stack (stack range 212-2) is separated from the calling thread's stack (212-1), and a return address of special value, such as 0x00 can be pushed onto the stack in stack range 212-2. Thus, when the called function is executed an ordinary return is treated as a normal return, and only the return matching the CALL_DEPRIVILEGED triggers the RETURN_PRIVILEGED operation.

In embodiments, the CPU 116 may perform a number of operations to execute the CALL_DEPRIVILEGED instruction to ensure function-level isolation and operate in deprivileged mode. In one example, the CALL_DEPRIVILIGED instruction is an extension or a modification of CALL FAR instruction and segment descriptors utilizing a lower privilege level, e.g., privilege level 4 or 'deprivileged.' The lower deprivileged operation mode includes several restrictions, such as disallowing system calls and disallowing CALL FARs to existing privilege levels 3-0, where privilege level 3 is a lower privileged level and privilege level 0 is a higher privileged level. The CPU 116, in privilege level 3, distinguishes four different access rights for memory pages. Moreover, system data structures can be completely protected. At privilege level 0, the CPU 116 allows read and write access to all pages mapped to memory. For example, there is no protection against corruption of the system tables or the code segment.

In embodiments, the function may invoke the CALL_DEPRIVILEGED, and the CPU may perform a number of tasks including loading an exception handler, enabling enforcement of protection keys, load limits for segment registers, configure a clock counter, pivot to a new stack (callee stack), and switch to callee function. In embodiments, the CPU 116 may configure the exception handler for system calls, "dangerous instructions" like move to segment register (CALL/JMP FAR), and to generate exceptions from predefined locations (segment descriptor, address defined by some of the registers, etc.). Other 'dangerous' instructions or actions may include SYSCALL, VMCALL, CALL FAR, JMP FAR instructions, loading segment registers, SGDT/LGDT, SIDT/LIDT and other instructions would cause an exception, handled by function caller exception handler.

The CPU 116 may enforce protection keys that are defined in the called address. Thus, all accesses to code segment 202-2, data segment 204-2 and stack segment 204-2 of the callee function will take place only with enforced protection keys. The callee function is prevented from changing protection key bits in the called address. Protection keys (PKEYs) use the fact that in a 64-bit addressing mode not all bits are used. The PKEYs are a new use for six high bits of an address to define more granular access to pages so that the same page may have different permissions depending on the value of these high-bits. For example, one value of these 6 bits, e.g., 000000b, may define that page is read-write data page, value 000001b may define the page as a read-only page, and value 000010b may define that no access is allowed. All these different permissions may be applied to the same page with the same linear address, and no aliasing is used. Since these permissions are application defined and can be controlled by the application, the CPU 116 limits control in deprivileged mode. The CPU 116 limits control by the application by forcing the same value as defined by the caller of a function to be used, disregarding attempts of the called function to change these values, and enforcing a specific set of permissions. As an example, the caller can create a special view of its' address space where all critical data structures are either read-only or inaccessible to called function, while those that are accessible can be accessed in same address space and no context switching is necessary.

Further, the CPU 116 loads limits for segment registers 120 from the LDT 135 or GDT 133 tables being given a descriptor, which is an index in one of the respective tables. The limits in combination with the protection keys prevent access to code segment 202-2, the data segment 204-2, and the stack segment 206-2 outside of allowed regions, e.g., CS range 208-2, DS range 210-2, and the SS range 212-2. To implement the limits, the CPU interprets the 'base' address in the GDT 133 or LDT 135 entries loaded in Segment Descriptors as a minimal possible accessible address (lower bound) in the caller address space 207-1, rather than a base address in the segment upon execution of the CALL_DE-PRIVELEGED instruction. This is to preserve a single address space between caller and callee to simplify the exchange of parameters. As previously mentioned, a single address space may be used for the caller function, e.g., the caller address space 207-1 and the callee function, e.g., callee address space 207-2 viewed from the perspective of the respective functions. For example, the CPU 116 may utilize segment registers to store base address values for the segments, wherein each base address value is a lower limit of an accessible range of a segment. In one example, the CPU 116 may store a first base address value in an ES register 128 to set a lower limit of an access range of the data segment (lower limit of DS range 210-2), store a second base address value in an FS register 132 to set a second lower limit of a second address range of the code segment (lower limit of CS Range 208-2), and store a third base address value in a GS register 130 to set a third lower limit of a third address of the stack segment (lower limit of SS range 212-2). Embodiments are not limited to this example. In some embodiments, one or more of the segment registers (ES, GS, and FS) may be associated with different segments (CS, DS, and SS) than the one provided in the example. Moreover and in some embodiments, store a forth base address value in a ES register to set a forth lower limit of a forth address of the data segment, store a fifth base address value in a FS register to set a fifth lower limit of a fifth address of the data segment, and store a sixth base address value in a GS register to set a sixth lower limit of a sixth address of the data segment.

In systems and as previously discussed, the DS segment 204 is used for data access for a function, the CS segment 202 is used for code, and the SS segment 206 is for the stack, although in some instances the stack may be in the DS segment 204. In some embodiments, the default configuration for the segments may be redefined for the deprivileged operation mode. For example, the ES, FS and GS segments may be utilized for data, code, and stack. These segments can be configured by caller function with operating system support to provision segment descriptors in a descriptor table (LDT 135 and/or GDT 133 and return appropriate selectors. When application requests to modify values in LDT 135 or GDT 133 tables, e.g., modify_ldt ( ) system call on Linux, the operating system ensures that settings provided by the application for these descriptors have correct privilege levels and do not refer to memory outside of process address space. The segment limits, being configured within an address space of caller, prevent deprivileged code from escaping while sharing the same address space.

However, limits to CS segment may mean that any dynamic run-time (like dynamically linked libc) execution is outside of the limits and will cause an exception, handled by caller exception handler. The caller function can provide a sandboxed implementation of run-time.

Segment register selectors are enhanced to encode segment which only defines an accessible range, while the base is the same as for caller function, in other words, the base is not added to the address, but access to the address below base will cause a range limit exception. Further, segment semantics can be extended in each data segment with an identifier for the code segment that is permitted to access it. Thus, a separate segment can be defined for each message object that needs to be exclusively accessible to a single function at a time and stored in GDT. When an instruction attempts to load the segment descriptor, in addition to the usual checks, the CS selector for the instruction is compared against the authorized CS selector in the data segment descriptor. In one example, a new instruction is defined to permit a function with a CS selector authorized to access the segment to transfer ownership of that segment to some other function with a designated CS selector.

The instruction performs the segment descriptor update without requiring an invocation of privileged software. Privileged software may construct a table in which each entry maps a source CS selector to a destination CS selector to specify that the function associated with the source CS selector is authorized to transfer ownership of one or more data segments to the function associated with the destination CS selector by using the instruction to update the specified data segment descriptors accordingly. If the instruction is invoked to transfer ownership of a data segment and either the current CS selector is not specified in the data segment descriptor or the current function is not authorized by the table to perform the requested descriptor update, then an exception or virtual machine (VM) exit may be generated. This helps to enable privileged software to control which functions can communicate with each other without requiring the privileged software to be invoked to perform each descriptor update. The table could be pointed to by a Model-Specific Register, Control Register, Virtual-Machine Control Structure, etc. The privileged software could delegate access to the table to a trusted function by storing the table in memory that is accessible by the trusted function. The instruction may specify an index in the authorization table to avoid the overhead of searching through the whole table for a matching entry. The privileged software may inform each function of the appropriate indices to use for various destination CS selectors.

The instruction may also check the current contents of the data segment registers to identify any with a selector matching that for the descriptor being modified. If a match is found, then an exception may be generated, or the segment register may be cleared to avoid the use of a stale segment descriptor value. It may be necessary to use a different GDT for each logical processor if a single function may be executed concurrently on multiple logical processors, since otherwise, a different logical processor than the one executing the instruction may still use a stale descriptor value.

In embodiments, the CPU 116 also configures a clock counter to timeout execution. More specifically, the CPU 116 copy current value of time stamp counter (TSC) invokes a clock counter to count a value, e.g., a starting value, towards a timeout value when in the deprivileged mode of operation. In one example, the start value may be 0 and the timeout value 100, and the clock may count in milliseconds. If the clock reaches the timeout value, e.g., a timeout occurs, the CPU 116 causes an exception.

In embodiments, the CPU 116 also pivots to a new stack, e.g., in stack range 212-2, to which the write access is enabled by the change of protection key (either change of permission per page associated with protection keys, or changing the key to another value which defines different permissions for the same page). A call-frame with a special value as a return address, e.g., 0x00, 0x00000, etc., is placed on this new stack. Alternatively, a value on the stack can be ignored an if a special instruction is used for RET_DEPRIVILIGED, like RET FAR, which is distinguished from a regular inter-function RET instruction. The CPU 116, when the CALL_DEPRIVILEGED is invoked, switches into the callee function. All flows of control within the body of the callee function proceed normally, but any call outside of the callee function that does not proceed into an allowed call into the user application automatically generate exception handled by exception handler.

In embodiments, the CALL_DEPRIVILEGED may be encoded without having to add another opcode. For example, the CALL_DEPRIVILEGED instruction may reuse CALL FAR, but provide a specific segment descriptor address, or add a prefix for the normal CALL instruction (like LOCK CALL or REP CALL or CS: CALL). For example, the CALL_DEPRIVILIGED instruction can extend the CALL FAR semantic by storing the data segment and stack segment, loading the data segment register and stack segment register, and a setting the privilege level (CPL) to a lower level, e.g., CPL=4, to indicate a deprivileged operation mode. Similarly, the semantic of RET would be redefined by reverting DS and SS changes for the RET_DEPRIVILEGED instruction.

In embodiments, the CPU 116 including the exception handler may handle any occurrence of the system call, exception, dangerous instruction, etc. during execution of deprivileged code. The exception handler receives details of the exception and will either implement/emulate the behavior of the instruction or cancel execution of the function. For example, the exception handler may 'forward' syscall for allowed system functions and continue execution. Specific calling conventions may be defined. For example, VMEXIT codes may be extended defining types of exception, and the RET_EXTERNAL instruction may be used to continue execution or clean stack and continue execution of caller function, such as RET_DEPRIVILIGED.

In embodiments, the CPU 116 may also handle nested calls. In the deprivileged operation mode, while the deprivileged code executes, modification of segment registers 120, descriptor tables 131, etc. is prohibited nested calls are not directly supported. However, the CPU 116 may handle and enable the nested calls through emulation. In one example, calls to functions would come from a single place, e.g., a FaaS Router, and the CPU 116 would employ 'CALL EXTERNAL to perform a function to function calls. 'CALL EXTERNAL' is used to implement a call back from a deprivileged function to the run-time environment for service functions typically provided by system calls, e.g., memory allocations, I/O operations, etc. The caller configures a list of entry points for functions which can be used in dedicated memory area referred by one of segment registers ES/FS/GS or other registers or known memory locations.

The CPU 116 may also process the reverse 'RET_DEPRIVILEGED' instruction that can either be explicitly triggered or implicitly triggered by the CPU 116 when RET to a special value address, e.g., "0" address, is encountered. Similar to CALL_DEPRIVILEGED instruction, the RET_DEPRIVILEGED instruction can be encoded by with a prefix like 'REP RET' or 'CS: RET' or other variants. In processing the reverse instruction, the CPU 116 returns control to the next instruction after the CALL_DEPRIVILEGED instruction in the caller function using an address from the caller's stacks which becomes a 'shadow stack' upon stack pivot with the call. If stack switching is not desirable, a proper a return address can be placed in the dedicated 'shadow stack' implemented in CPU, like 'Return Stack Buffer,' which is used to get return address for RET instructions, or other dedicated structure. The address is the next address after the address associated with the CALL_DEPRIVILEGED instruction. The CPU 116 may switch into the conventional execution model, and pivot stack to original stack, e.g., from stack region 212-2 to stack region 212-1. RET_DEPRIVILEGED instruction can be encoded as a RET instruction in the case of using a special value on the stack to distinguish between a regular RET and RET_DEPRIVILIGED, or its' not expected that called function will make calls to other functions other than using CALL_EXTERNAL. This will enable double-use functions and ensure binary compatibility, assuming that being called, when executed in conventional mode, the double-use functions will perform as regular functions.

In embodiments, the CPU 116 may also process a CALL_EXTERNAL instruction that may be utilized by a programmer in a software program. More specifically a delimited action or function include a CALL_EXTERNAL instruction to make calls to its operating environment (runtime) for such services as allocating memory, I/O operations, accessing events, etc., in the deprivileged operation. The CALL_EXTERNAL instruction uses function index as a parameter, so only a number of allowed calls can be performed. The CALL_EXTERNAL instruction may be implemented by reusing encoding of the existing SYSCALL or VMCALL instructions and has a redefined semantic instead of producing an exception as a 'dangerous instruction,' and providing a new functionality of CALL_EXTERNAL in the deprivileged operation mode. Moreover, the CALL_EXTERNAL instruction will cause an exception with predefined code, allowing the caller function to provide requested functionality.

Similarly, the CPU 116 may process a RET_EXTERNAL instruction utilized in a software program. In Embodiments, the RET_EXTERNAL instruction is used by exception handler implemented by caller function to return control to deprivileged function after exception or CALL_EXTERNAL. The CPU 116 will transfer control to the next instruction after the instruction that caused the exception.

Figure 3:
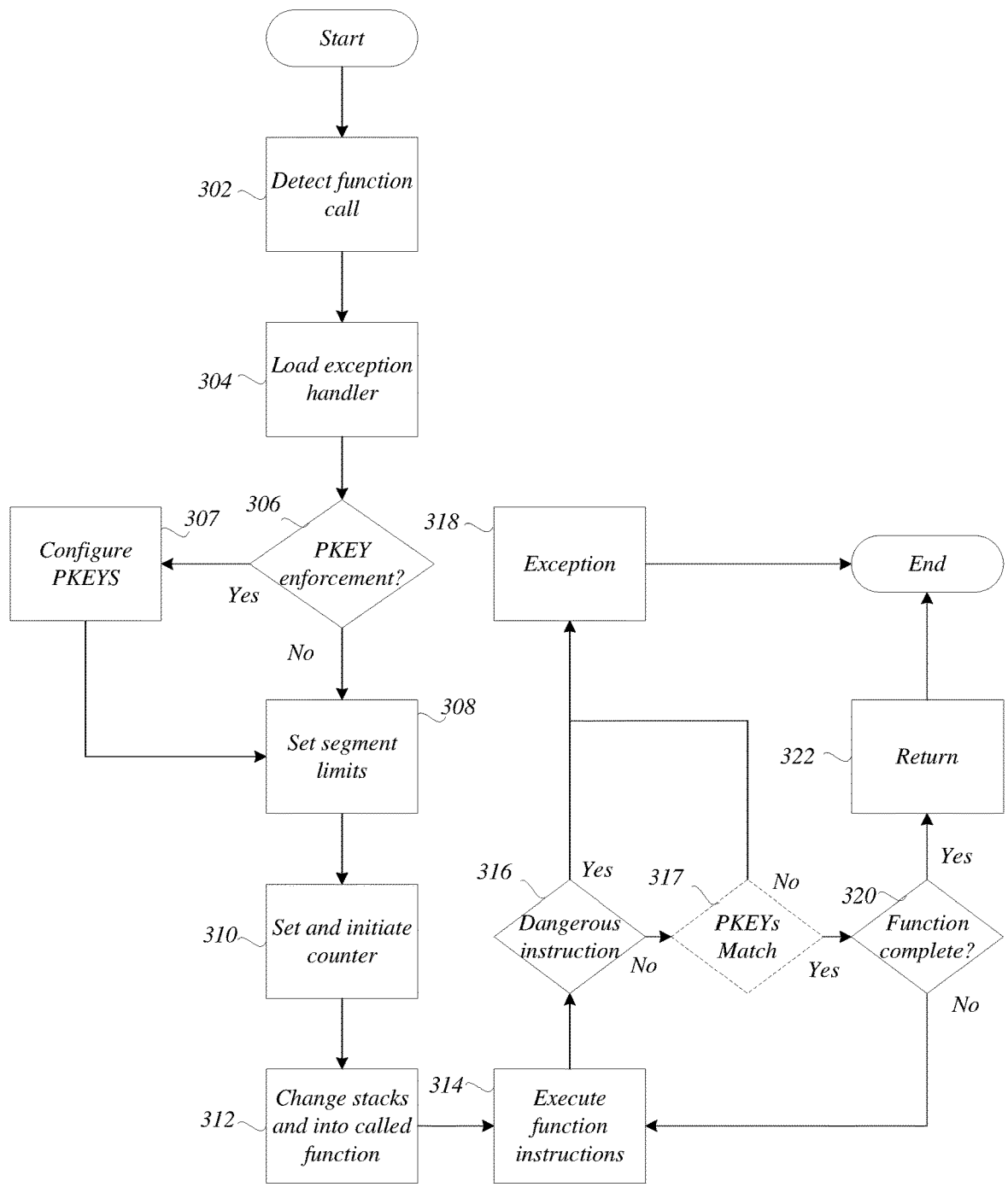
FIG. 3 illustrates an example of a logic flow.

FIG. 3 illustrates an example embodiment of a logic flow 300. The logic flow 300 may be representative of some or all of the operations executed by one or more embodiments described herein. For example, the logic flow 300 may illustrate operations performed by device 100 and CPU 116.

At block 302, embodiments include detecting a call instruction from a first function to a second instruction. In embodiments, the call may be to the second instruction associated with a different address space than the caller function and having a different privilege level. In one example, the CPU 116 determines a CALL_DEPRIVILEGED instruction is invoked. The CALL_DEPRIVILEGED instruction may be a new instruction with a new opcode or may be encoded without having to add another opcode. For example, the CALL_DEPRIVILEGED instruction may reuse CALL FAR, but provide a specific segment descriptor address, or add a prefix for the normal CALL instruction (like LOCK CALL or REP CALL or CS: CALL). For example, the CALL_DEPRIVILIGED instruction can extend the CALL FAR semantic, and the CPU 116 may detect the call.

At block 304, the CPU 116 may load an exception handler for the caller function to handle exceptions that occur while the callee function is executing. In embodiments, the CPU 116 may load the exception handler for system calls, "dangerous instructions" like move to segment register (CALL/ JMP FAR), and to generate exceptions from predefined locations (segment descriptor, address defined by some of the registers, etc.).

At block 306, the CPU 116 may determine whether PKEYs are to be utilized. In some instances, PKEYs may not be utilized, and page permissions are used, e.g., when they are not available on a system or configured by a system. In these instances, the logic flow 300 may continue to block 308. However, in other instances, PKEYs may be utilized, and they may be configured at block 307. In one example, the CPU 116 may determine PKEYs for utilization at block 307 based on the PKEYs configured as part of page permissions at block 307.

At block 308, the CPU 116 sets and enforces limits for the segments. In embodiments, to implement the limits, the CPU 116 interprets the 'base' address of the CALL_DEPRIVILEGED instruction and Segment Descriptors as minimal possible accessible address (lower bound) in the caller address space for each of the code segment, the data segment, and the stack segment, rather than base address in the segment.

The CPU 116, at block 310, sets (and initiates) a clock counter to timeout execution when the counter hits a timeout value. More specifically, the CPU 116 invokes a clock counter to count a value, e.g., a starting value, towards a timeout value when in the deprivileged mode of operation and the callee function is executing. If the clock reaches the timeout value, e.g., a timeout occurs, the CPU 116 causes an exception.

At block 312, the CPU 116 changes stacks. More specifically, the CPU 116 pivots to a new stack located within a range of addresses specified in the segments. In addition, a special value, e.g., 0x00, 0x00000, etc., is placed on the new stack. Further, the CPU 116 switches into the callee function. At block 314, the CPU 116 executes the function, e.g., one or more instructions for the function.

The CPU 116 including the exception handler may monitor the instructions executed for the function. Further and at block 316, the CPU 116 including the exception handler may determine whether a 'dangerous' instruction is attempting to be executed. If a dangerous instruction is not detected at block 116, the CPU 116 may determine a protection key from the called address in the instruction and enforce protection keys that are defined in the called address when protection keys are utilized at optional block 317. Thus, all accesses to code segment 202-2, data segment 204-2 and stack segment 204-2 of the callee function will take place only with enforced protection keys. Moreover, the callee function is prevented from changing protection key bits in the called address. If at block 316, the CPU 116 detects a dangerous instruction or at block 317, the CPU 116 determines that a protection key does not match a value assigned to a page or region attempted to access, the CPU 116 may cause an exception at block 320 and/or return execution back to the caller function. The CPU 116 may permit valid access attempts having matching protection keys and values at block 317.

In embodiments, the logic flow 300 at block 320 may determine whether a function may continue to be executed until completion. At block 320, the CPU 116 may determine whether the function is complete, e.g., any instructions remain. If so, the function may continue to execute at block 314. However, the CPU 116 may determine the function is complete and/or detect the special value on the stack and return control back to the caller function at block 322. The CPU 116 may return control and pivot back to the segments for the caller function.

Figure 4:
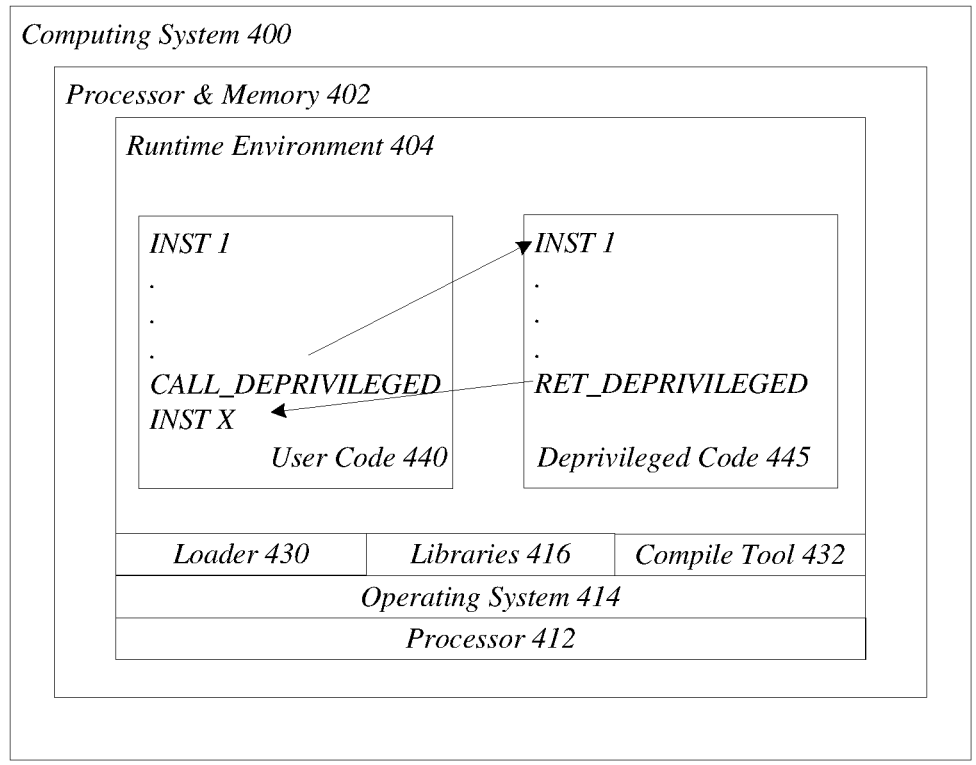
FIG. 4 illustrates an example of a system.

Concerning FIG. 4, a block diagram illustrates an example computing system 400 incorporated with a runtime environment 404 and a processor and memory arrangement 402. The processor and memory arrangement 402 represents a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, the processor 412 may be configured to provide processing functions for the operating system 414. Moreover, the processor and memory arrangement 402 may include at least one processor 414. The processor 414 may include, for example, a CPU, a single or multi-core microprocessor, such as CPU 116 or the like. Further, the OS 414 may manage memory resources, schedule task execution, and so forth.

To support interaction with the underlying system, the processor and memory arrangement 402 may include a plurality of libraries 416. The s libraries 416 may be configured to provide calls between applications including user code 440 and/or deprivileged code 445 and the OS 414. The libraries 116 may also provide various platform operating functions such as file storage and input/output operations. The runtime environment 404 may include a loader to load code that may be compiled via the compile tools 432 and/or by a different computing system.

In embodiments, the processor and memory arrangement 402 may have loaded therein applications or software including user code 440 and deprivileged. The application represents a broad range of applications. Examples of an application may include but are not limited to, personal assistant, productivity, or social networking applications, such as calendar, word processing, spreadsheet, Twitter, Facebook, et al., or generic application agents, such as a browser.

In embodiments, the runtime environment 404 may execute therein an application having user code 440 via the processor 412. The processor 412 may execute each instruction of the user code 440 including handling a call to other code. In the illustrates example, the user code 440 may include a CALL_DEPRIVILEGED instruction to call the deprivileged code 445. The processor 412 may execute the call as previously discussed in logic flow 300 including loading an exception handler, enforcing protection keys, setting segment region limits, and so forth. The deprivileged code 445 may operate a deprivileged operation mode, e.g., CPL 4. The deprivileged code 445 may execute until a special value is detected on the stack of the deprivileged code 445 and a return is triggered. For example, the processor 412 may execute a RET_DEPRIVILEGED instruction and return to the next instruction after the CALL_DEPRIVILEGED instruction.

Figure 5:
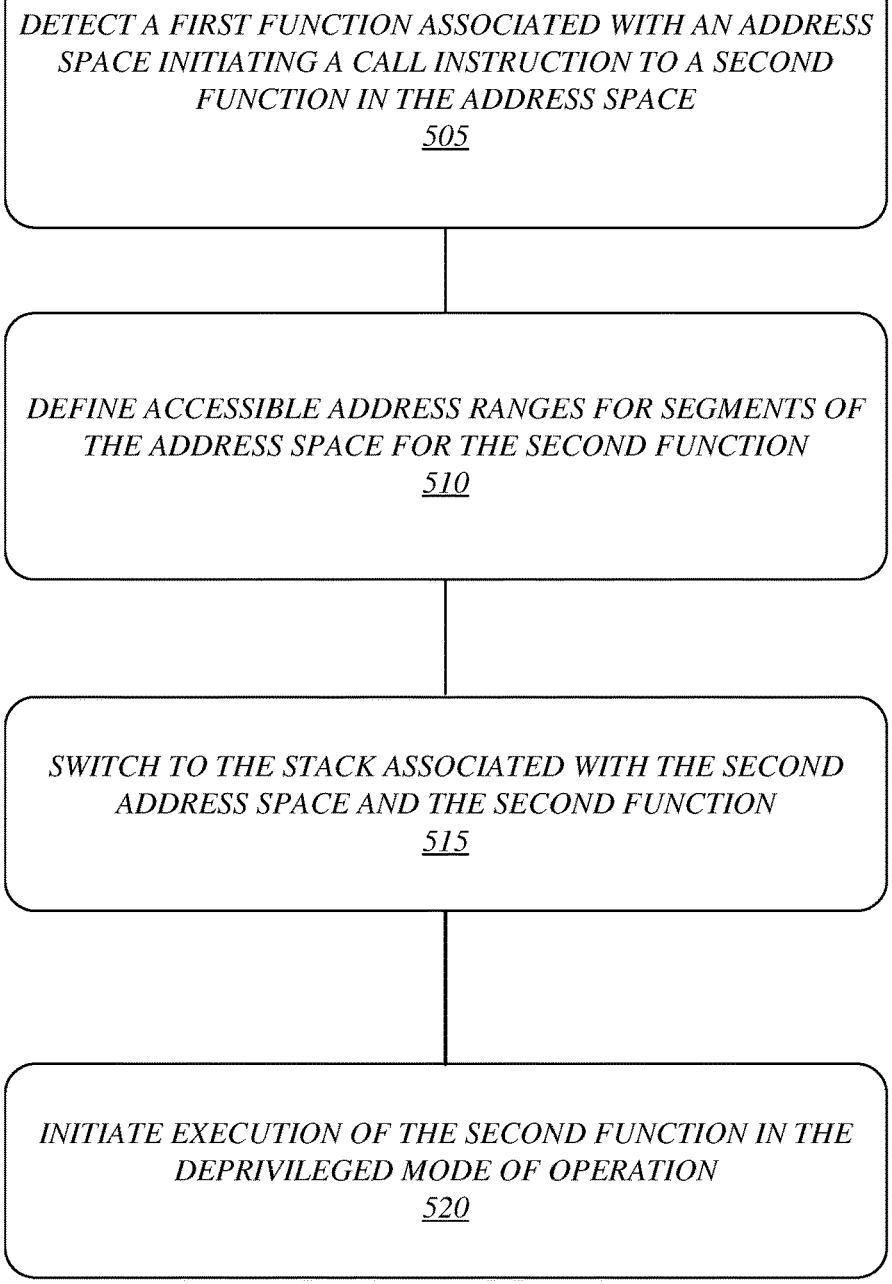
FIG. 5 illustrates an example of a second logic flow.

FIG. 5 illustrates an example embodiment of a second logic flow 500. The logic flow 400 may be representative of some or all of the operations executed by one or more embodiments described herein. For example, the logic flow 500 may illustrate operations performed by device 100 and CPU 116 and computing system 400 and processor 412.

The logic flow 500 includes detecting a first function associated with an address space initiating a call instruction to a second function in the address space. In embodiments, the first function calls the second function in a deprivileged mode of operation. For example, the first function may be operating in user space and have an associated address in memory to process data. The first function may include a number of instructions including a call instruction, which may be a CALL_DEPRIVILEGED instruction, to initiate instructions of the second function. The second function may have a different privilege level and a different portion of the address space allocated. Moreover, the second function may operate in a deprivileged operation mode. As previously discussed, the CALL_DEPRIVILEGED instruction may utilize a new opcode or a current (FAR CALL) opcode with different semantics.

At block 510, the logic flow 500 includes defining accessible address ranges for segments of the address space for the second function. In embodiments, each segment is to a have a different address range in the address space where the second function is permitted to access in the deprivileged mode of operation. More specifically, the second function may operate utilizing defined regions in the code segment, the data segment, and stack segment based on information in the called address. If the second function attempts to jump or move out one of those regions the exception handler may cause an exception.

At block 515, the logic flow 500 includes switching to the stack associated with the second address space and the second function. Further and at block 525 the logic flow 500 includes initiating execution of the second function in the deprivileged mode of operation. The instructions of the second function may operate until the special value is detected and control is returned to the first function.

Figure 6:
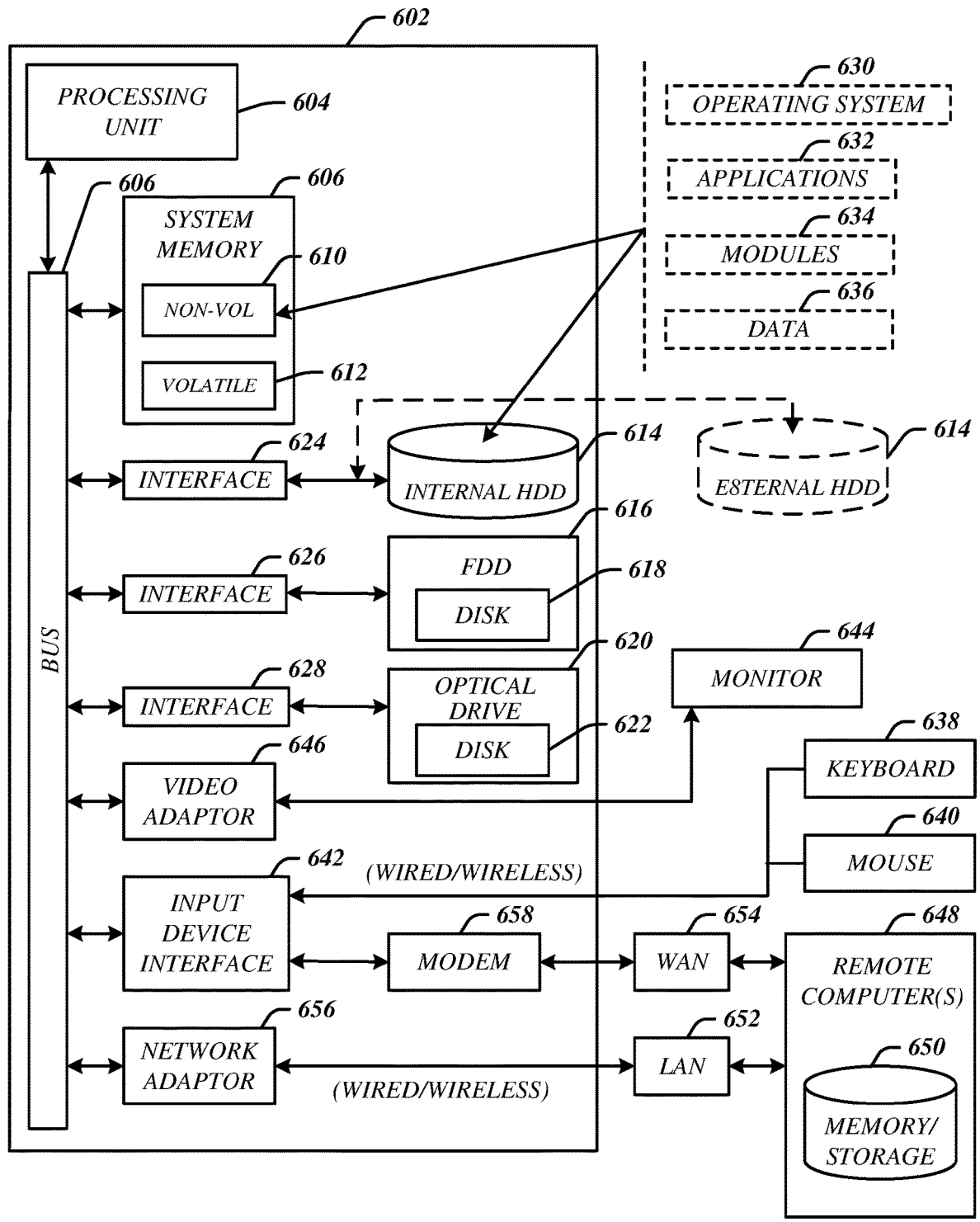
FIG. 6 illustrates an example of a first computing architecture.

FIG. 6 illustrates an embodiment of an exemplary computing architecture 600 suitable for implementing various embodiments as previously described. In one embodiment, the computing architecture 600 may include or be implemented as part of device 100, system 400, and/or device 700.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or another type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
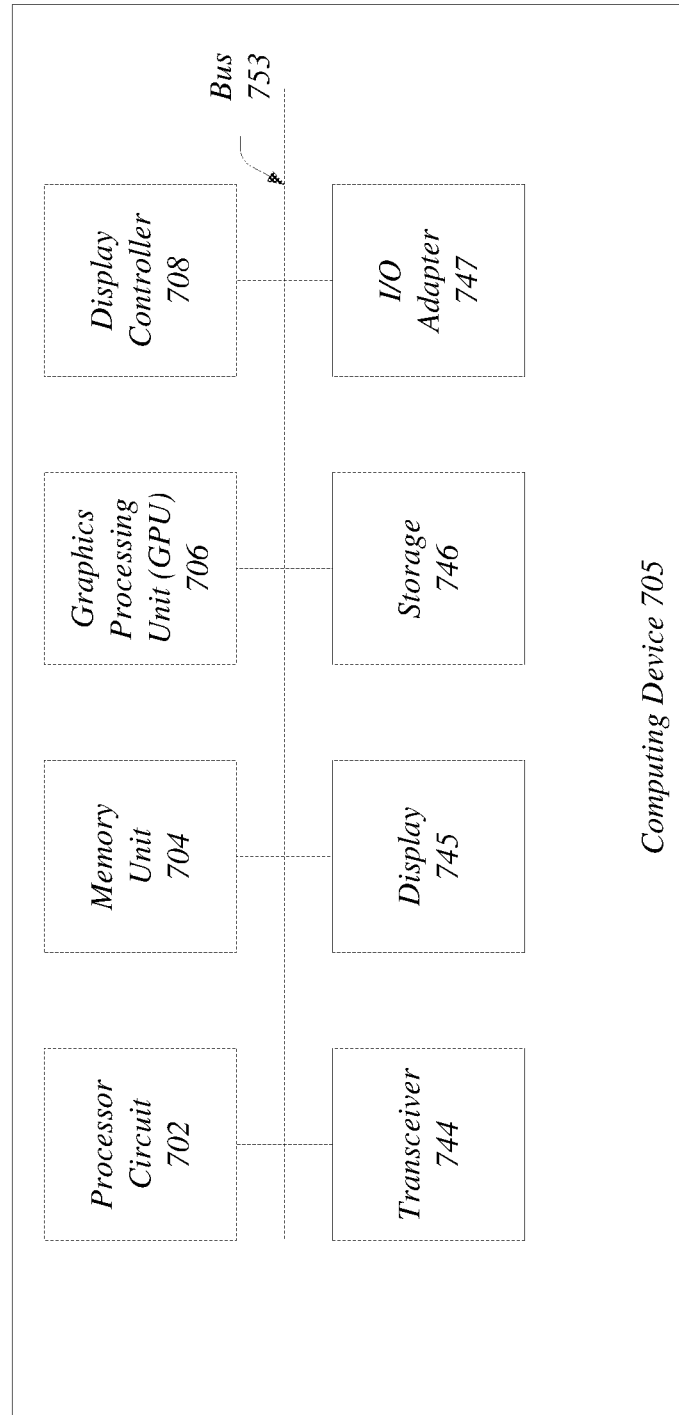
FIG. 7 illustrates an exemplary embodiment of a device.

FIG. 7 illustrates one embodiment of a system 700. In various embodiments, system 700 may be representative of a system or architecture suitable for use with one or more embodiments described herein, such as device 100.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example; it can be appreciated that elements in any suitable topology may be used in system 700 as desired for a given implementation. The embodiments are not limited in this context.

In various embodiments, system 700 may include a computing device 705 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 705 may include processor circuit 702. Processor circuit 702 may be implemented using any processor or logic device. The processing circuit 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 702 may be connected to and communicate with the other elements of the computing system via an interconnect 743, such as one or more buses, control lines, and data lines.

In one embodiment, computing device 705 may include a memory unit 704 to couple to processor circuit 702. Memory unit 704 may be coupled to processor circuit 702 via communications bus 753, or by a dedicated communications bus between processor circuit 702 and memory unit 704, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 705 may include a graphics processing unit (GPU) 706, in various embodiments. The GPU 706 may include any processing unit, logic or circuitry optimized to perform graphics-related operations as well as the video decoder engines and the frame correlation engines. The GPU 706 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 706 may process any type of graphics data such as pictures, videos, programs, animation, 3D, 2D, objects images and so forth.

In some embodiments, computing device 705 may include a display controller 708. Display controller 708 may be any type of processor, controller, circuit, logic, and so forth for processing graphics information and displaying the graphics information. The display controller 708 may receive or retrieve graphics information from one or more buffers. After processing the information, the display controller 708 may send the graphics information to a display.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, computing device 705 may include a display 745. Display 745 may constitute any display device capable of displaying information received from processor circuit 702, graphics processing unit 706 and display controller 708.

In various embodiments, computing device 705 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 705 may include one or more I/O adapters 747. Examples of I/O adapters 747 may include Universal Serial Bus (USB) ports/adapters, IEEE 1374 Firewire ports/adapters, and so forth. The embodiments are not limited in this context.

The detailed disclosure now turns to providing examples that pertain to further embodiments. Examples one through twenty-seven provided below are intended to be exemplary and non-limiting.

In a first example, embodiments may include an apparatus, a device, a system, means for, and so forth including memory to store instructions, and processing circuitry coupled with the memory, the processing circuitry operable to execute the instructions, that when executed, enable processing circuitry to detect a first function associated with an address space initiating a call instruction to a second function in the address space, the first function to call the second function in a deprivileged mode of operation, define accessible address ranges for segments of the address space for the second function, each segment to a have a different address range in the address space where the second function is permitted to access in the deprivileged mode of operation, switch to the stack associated with the second address space and the second function, and initiate execution of the second function in the deprivileged mode of operation.

In a second example and furtherance of the first example, embodiments may include an apparatus, a device, a system, means for, and so forth including processing circuitry to detect completion of execution of the second function, return control to the first function for execution at a next instruction after the call instruction based on a return address, switch to a stack in the address space associated with the first function, and switch from the deprivileged mode operation to a normal mode operation.

In a third example and furtherance of any of the previous examples, embodiments may include an apparatus, a device, a system, means for, and so forth including processing circuitry to determine the return address to return control to the first function based on a special value placed on a second stack associated with the second function.

In a fourth example and furtherance of any of the previous examples, embodiments may include an apparatus, a device, a system, means for, and so forth including processing circuitry to initiate an exception handler to handle system call instructions initiated by the second function when in the deprivileged mode of operation, the system call instructions comprising at least one of a SYSCALL instruction, a VMCALL instruction, a CALL FAR instruction, JMP FAR, a load segment register instruction, and a set of operations to manipulate system parameters defined as privileged.

In a fifth example and furtherance of any of the previous examples, embodiments may include an apparatus, a device, a system, means for, and so forth including processing circuitry to detect an invocation of one of the system call instructions by the second function, cause an exception, and perform at least one of return control to the first function for execution of a next instruction after the call instruction and cause an exception by an exception handler.

In a sixth example and furtherance of any of the previous examples, embodiments may include an apparatus, a device, a system, means for, and so forth including processing circuitry to determine a protection key defined in a called address of the second function to prevent the second function from one or more of modifying a bit in outside a permitted portion of the address space and jumping outside of the second address space of the second function.

In a seventh example and furtherance of any of the previous examples, embodiments may include an apparatus, a device, a system, means for, and so forth including processing circuitry to invoke a clock counter to count a value towards a timeout value when in the deprivileged mode of operation, and cause an exception when the value equals the timeout value.

In an eighth example and furtherance of any of the previous examples, embodiments may include an apparatus, a device, a system, means for, and so forth including processing circuitry to utilize segment registers to store base address values for the segments, wherein each base address value is a lower limit of an accessible range of a segment.

In a ninth example and furtherance of any of the previous examples, embodiments may include an apparatus, a device, a system, means for, and so forth including processing circuitry to store a first base address value in an extended segment (ES) register to set a lower limit of an access range of the data segment, store a second base address value in an FS register to set a second lower limit of a second address range of the code segment, and store a third base address value in a GS register to set a third lower limit of a third address of the stack segment.

In a tenth example and furtherance of any of the previous examples, embodiments may include an apparatus, a device, a system, and so forth including processing circuitry to a network interface coupled with the memory and the processing circuitry, the network interface to communicate information, e.g., provide FaaS functionality.

In an eleventh example and furtherance of any of the previous examples, embodiments may include a computer-implemented method including detecting completion of execution of the second function, returning control to the first function for execution at a next instruction after the call instruction based on a return address, switching to a stack in the address space associated with the first function, and switching from the deprivileged mode operation to a normal mode operation.

In a twelfth example and furtherance of any of the previous examples, embodiments may include a computer-implemented method including determining the return address to return control to the first function based on a special value placed on a second stack associated with the second function.

In a thirteenth example and furtherance of any of the previous examples, embodiments may include a computer-implemented method including initiating an exception handler to handle system call instructions initiated by the second function when in the deprivileged mode of operation, the system call instructions comprising at least one of a SYSCALL instruction, a VMCALL instruction, a CALL FAR instruction, JMP FAR, a load segment register instruction, and a set of operations to manipulate system parameters defined as privileged.

In a fourteenth example and furtherance of any of the previous examples, embodiments may include a computer-implemented method including detecting an invocation of one of the system call instructions by the second function; cause an exception, and performing at least one of return control to the first function for execution of a next instruction after the call instruction and cause an exception by an exception handler.

In a fifteenth example and furtherance of any of the previous examples, embodiments may include a computer-implemented method including determining a protection key defined in a called address of the second function to prevent the second function from one or more of modifying a bit in outside a permitted portion of the address space and jumping outside of the second address space of the second function.

In a sixteenth example and furtherance of any of the previous examples, embodiments may include a computer-implemented method including invoking a clock counter to count a value towards a timeout value when in the deprivileged mode of operation, and causing an exception when the value equals the timeout value.

In a seventeenth example and furtherance of any of the previous examples, embodiments may include a computer-implemented method including utilizing segment registers to store base address values for the segments, wherein each base address value is a lower limit of an accessible range of a segment.

In an eighteenth example and furtherance of any of the previous examples, embodiments may include a computer-implemented method including storing a first base address value in an extended segment (ES) register to set a lower limit of an access range of a data segment, storing a second base address value in an FS register to set a second lower limit of a second address range of a code segment, and storing a third base address value in a GS register to set a third lower limit of a third address of a stack segment.

In a nineteenth example and furtherance of any of the previous examples, embodiments may include a non-transitory computer-readable storage medium including a plurality of instructions, that when executed, enable processing circuitry to detect a first function associated with an address space initiating a call instruction to a second function in the address space, the first function to call the second function in a deprivileged mode of operation, define accessible address ranges for segments of the address space for the second function, each segment to a have a different address range in the address space where the second function is permitted to access in the deprivileged mode of operation, switch to the stack associated with the second address space and the second function, and initiate execution of the second function in the deprivileged mode of operation.

In a twentieth example and furtherance of any of the previous examples, embodiments may include a non-transitory computer-readable storage medium including a plurality of instructions, that when executed, enable processing circuitry to detect completion of execution of the second function, return control to the first function for execution at a next instruction after the call instruction based on a return address, switch to a stack in the address space associated with the first function, and switch from the deprivileged mode operation to a normal mode operation.

In a twenty-first example and furtherance of any of the previous examples, embodiments may include a non-transitory computer-readable storage medium including a plurality of instructions, that when executed, enable processing circuitry to determine the return address to return control to the first function based on a special value placed on a second stack associated with the second function.

In a twenty-second example and furtherance of any of the previous examples, embodiments may include a non-transitory computer-readable storage medium including a plurality of instructions, that when executed, enable processing circuitry to determine a protection key defined in a called address of the second function to prevent the second function from one or more of modifying a bit in outside a permitted portion of the address space and jumping outside of the second address space of the second function.

In a twenty-third example and furtherance of any of the previous examples, embodiments may include a non-transitory computer-readable storage medium including a plurality of instructions, that when executed, enable processing circuitry to invoke a clock counter to count a value towards a timeout value when in the deprivileged mode of operation, and cause an exception when the value equals the timeout value In a twenty-fourth example and furtherance of any of the previous examples, embodiments may include a non-transitory computer-readable storage medium including a plurality of instructions, that when executed, enable processing circuitry to utilize segment registers to store base address values for the segments, wherein each base address value is a lower limit of an accessible range of a segment.

In a twenty-fifth example and furtherance of any of the previous examples, embodiments may include a non-transitory computer-readable storage medium including a plurality of instructions, that when executed, enable processing circuitry to store a first base address value in an extended segment (ES) register to set a lower limit of an access range of a data segment, store a second base address value in an FS register to set a second lower limit of a second address range of a code segment, and store a third base address value in a GS register to set a third lower limit of a third address of a stack segment.

In a twenty-sixth example and furtherance of any of the previous examples, embodiments may include a non-transitory computer-readable storage medium including a plurality of instructions, that when executed, enable processing circuitry to initiate an exception handler to handle system call instructions initiated by the second function when in the deprivileged mode of operation, the system call instructions comprising at least one of a SYSCALL instruction, a VMCALL instruction, a CALL FAR instruction, JMP FAR, a load segment register instruction, and a set of operations to manipulate system parameters defined as privileged.

In a twenty-seventh example and furtherance of any of the previous examples, embodiments may include a non-transitory computer-readable storage medium including a plurality of instructions, that when executed, enable processing circuitry to detect an invocation of one of the system call instructions by the second function, cause an exception, and perform at least one of return control to the first function for execution of a next instruction after the call instruction and cause an exception by an exception handler.

In a twenty-eighth example and in furtherance of any previous example, embodiments may include processing circuitry to construct a table comprising entries, each entry maps a source code segment (CS) selector to a destination CS selector to specify that the first function associated with the source CS selector is authorized to transfer ownership of one or more data segments to the second function associated with the destination CS selector.

Some embodiments may be described using the expression "one embodiment" or "an embodiment" along with their derivatives. These terms mean that a feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
memory to store instructions; and
processing circuitry coupled with the memory, the processing circuitry comprising at least a data segment (DS) register and one or more other segment registers, the processing circuitry operable to execute the instructions, which when executed, enable processing circuitry to:
receive a deprivileged call instruction from a first function, the deprivileged call instruction to call a second function in a deprivileged mode of operation, the deprivileged call comprising an indication of a callee address of the second function;
load the DS register with a prepared entry from a global descriptor table (GDT) or a local descriptor table (LDT), the prepared entry associated with the first function;
limit access by the second function to an address range defined by the prepared entry to enforce the deprivileged mode of operation;
load at least one of the one or more other segment registers with a table comprising indications of addresses of the memory for call-back functions and exception handlers with which the second function can interact to enforce the deprivileged mode of operation;
identify a protection key defined by at least one of the six highest order bits of the callee address;
apply a permission set to the address range defined by the prepared entry based on the protection key to enforce the deprivileged mode of operation; and
initiate execution of the second function in the deprivileged mode of operation.

2. The apparatus of claim 1, the processing circuitry to:
detect completion of execution of the second function;
return control to the first function for execution at a next instruction after the call instruction based on a return address;
switch to a stack in the address space associated with the first function; and
switch from the deprivileged mode operation to a normal mode operation.

3. The apparatus of claim 2, the processing circuitry to determine the return address to return control to the first function based on a special value placed on a second stack associated with the second function.

4. The apparatus of claim 1, the processing circuitry to initiate an exception handler to handle system call instructions initiated by the second function when in the deprivileged mode of operation, the system call instructions comprising at least one of a SYSCALL instruction, a VMCALL instruction, a CALL FAR instruction, JMP FAR, a load segment register instruction, and a set of operations to manipulate system parameters defined as privileged.

5. The apparatus of claim 4, the processing circuitry to:
detect an invocation of one of the system call instructions by the second function;
cause an exception; and
perform at least one of returning control to the first function for execution of a next instruction after the call instruction and causing an exception by an exception handler.

6. The apparatus of claim 1, the processing circuitry to determine a protection key defined in a called address of the second function to prevent the second function from one or more of modifying a bit in outside a permitted portion of the address space and jumping outside of the second address space of the second function.

7. The apparatus of claim 1, the processing circuitry to:
invoke a clock counter to count a value towards a timeout value when in the deprivileged mode of operation; and
cause an exception when the value equals the timeout value.

8. The apparatus of claim 1, the processing circuitry to:
utilize segment registers to store base address values for the segments, wherein each base address value is a lower limit of an accessible range of a segment;
store a first base address value in an extended segment (ES) register to set a lower limit of an access range of a data segment,
store a second base address value in an FS register to set a second lower limit of a second address range of a code segment, and
store a third base address value in a GS register to set a third lower limit of a third address of a stack segment.

9. The apparatus of claim 1, the processing circuitry to construct a table comprising entries, each entry maps a source code segment (CS) selector to a destination CS selector to specify that the first function associated with the source CS selector is authorized to transfer ownership of one or more data segments to the second function associated with the destination CS selector.

10. A computer-implemented method, comprising:
receiving a deprivileged call instruction from a first function, the deprivileged call instruction to call a second function in a deprivileged mode of operation, the deprivileged call comprising an indication of a callee address of the second function;
loading a data segment (DS) register of a processor with a prepared entry from a global descriptor table (GDT) or a local descriptor table (LDT), the prepared entry associated with the first function;
limiting access by the second function to an address range defined by the prepared entry to enforce the deprivileged mode of operation;
loading at least one of a one or more other segment registers of the processor with a table comprising indications of addresses of a memory for call-back functions and exception handlers with which the second function can interact to enforce the deprivileged mode of operation, the memory coupled to the processor;
identifying a protection key defined by at least one of the six highest order bits of the callee address;
applying a permission set to the address range defined by the prepared entry based on the protection key to enforce the deprivileged mode of operation; and
initiating execution of the second function in the deprivileged mode of operation.

11. The computer-implemented method of claim 10, comprising:
detecting completion of execution of the second function;
returning control to the first function for execution at a next instruction after the call instruction based on a return address;
switching to a stack in the address space associated with the first function; and
switching from the deprivileged mode operation to a normal mode operation.

12. The computer-implemented method of claim 11, comprising determining the return address to return control to the first function based on a special value placed on a second stack associated with the second function.

13. The computer-implemented method of claim 10, comprising initiating an exception handler to handle system call instructions initiated by the second function when in the deprivileged mode of operation, the system call instructions comprising at least one of a SYSCALL instruction, a VMCALL instruction, a CALL FAR instruction, JMP FAR, a load segment register instruction, and a set of operations to manipulate system parameters defined as privileged.

14. The computer-implemented method of claim 13, comprising:
   detecting an invocation of one of the system call instructions by the second function;
   causing an exception; and
   performing at least one of returning control to the first function for execution of a next instruction after the call instruction and causing an exception by an exception handler.

15. The computer-implemented method of claim 10, comprising determining a protection key defined in a called address of the second function to prevent the second function from one or more of modifying a bit in outside a permitted portion of the address space and jumping outside of the second address space of the second function.

16. The computer-implemented method of claim 10, comprising:
   invoking a clock counter to count a value towards a timeout value when in the deprivileged mode of operation; and
   causing an exception when the value equals the timeout value.

17. The computer-implemented method of claim 10, comprising utilizing segment registers to store base address values for the segments, wherein each base address value is a lower limit of an accessible range of a segment.

18. The computer-implemented method of claim 10, comprising:
   storing a first base address value in an extended segment (ES) register to set a lower limit of an access range of a data segment;
   storing a second base address value in an FS register to set a second lower limit of a second address range of a code segment, and
   storing a third base address value in a GS register to set a third lower limit of a third address of a stack segment.

19. A non-transitory computer-readable storage medium, comprising a plurality of instructions, that when executed, enable processing circuitry to:
   receive a deprivileged call instruction from a first function, the deprivileged call instruction to call a second function in a deprivileged mode of operation, the deprivileged call comprising an indication of a callee address of the second function;
   load a data segment (DS) register of the processing circuitry with a prepared entry from a global descriptor table (GDT) or a local descriptor table (LDT), the prepared entry associated with the first function;
   limit access by the second function to an address range defined by the prepared entry to enforce the deprivileged mode of operation;
   load at least one of a one or more other segment registers of the processing circuitry with a table comprising indications of addresses of a memory for call-back functions and exception handlers with which the second function can interact to enforce the deprivileged mode of operation, the memory coupled to the processing circuitry;
   identify a protection key defined by at least one of the six highest order bits of the callee address;
   apply a permission set to the address range defined by the prepared entry based on the protection key to enforce the deprivileged mode of operation; and
   initiate execution of the second function in the deprivileged mode of operation.

20. The non-transitory computer-readable storage medium of claim 19, comprising a plurality of instructions, that when executed, enable processing circuitry to:
   detect completion of execution of the second function;
   return control to the first function for execution at a next instruction after the call instruction based on a return address;
   switch to a stack in the address space associated with the first function; and
   switch from the deprivileged mode operation to a normal mode operation.

21. The non-transitory computer-readable storage medium of claim 20, comprising a plurality of instructions, that when executed, enable processing circuitry to determine the return address to return control to the first function based on a special value placed on a second stack associated with the second function.

22. The non-transitory computer-readable storage medium of claim 19, comprising a plurality of instructions, that when executed, enable processing circuitry to determine a protection key defined in a called address of the second function to prevent the second function from one or more of modifying a bit in outside a permitted portion of the address space and jumping outside of the second address space of the second function.

23. The non-transitory computer-readable storage medium of claim 19, comprising a plurality of instructions, that when executed, enable processing circuitry to:
   invoke a clock counter to count a value towards a timeout value when in the deprivileged mode of operation; and
   cause an exception when the value equals the timeout value.

24. The non-transitory computer-readable storage medium of claim 19, comprising a plurality of instructions, that when executed, enable processing circuitry to utilize segment registers to store base address values for the segments, wherein each base address value is a lower limit of an accessible range of a segment.

25. The non-transitory computer-readable storage medium of claim 19, comprising a plurality of instructions, that when executed, enable processing circuitry to:
   store a first base address value in an extended segment (ES) register to set a lower limit of an access range of a data segment,
   store a second base address value in an FS register to set a second lower limit of a second address range of a code segment, and
   store a third base address value in a GS register to set a third lower limit of a third address of a stack segment.

* * * * *